(12) United States Patent
Kim et al.

(10) Patent No.: US 10,761,679 B2
(45) Date of Patent: Sep. 1, 2020

(54) INTERFACING METHOD FOR USER FEEDBACK

(71) Applicant: KAKAO CORP., Jeju-do (KR)

(72) Inventors: Jung Eun Kim, Seoul (KR); You Jhi Hwang, Gyeonggi-do (KR)

(73) Assignee: KAKAO CORP., Gyeonggi-do (KR)

( * ) Notice: Subject to any disclaimer, the term of this patent is extended or adjusted under 35 U.S.C. 154(b) by 579 days.

(21) Appl. No.: 14/845,157

(22) Filed: Sep. 3, 2015

(65) Prior Publication Data

US 2016/0070438 A1 Mar. 10, 2016

(30) Foreign Application Priority Data

Sep. 5, 2014 (KR) ........................ 10-2014-0119016

(51) Int. Cl.
| G06F 3/048 | (2013.01) |
| G06F 3/0481 | (2013.01) |
| G06F 3/0484 | (2013.01) |
| G06F 16/9535 | (2019.01) |

(52) U.S. Cl.
CPC ...... G06F 3/04817 (2013.01); G06F 3/04842 (2013.01); G06F 16/9535 (2019.01)

(58) Field of Classification Search
CPC ................................................. G06F 3/04842
See application file for complete search history.

(56) References Cited

U.S. PATENT DOCUMENTS

2011/0179385 A1* 7/2011 Li ....................... G06F 16/7867
715/810
2015/0212689 A1* 7/2015 Gomez-Rosado ............................
G06F 3/04817
715/765

FOREIGN PATENT DOCUMENTS

| JP | 2005-086769 A | 3/2005 |
| JP | 2010-271757 A | 12/2010 |
| JP | 2012-010062 A | 1/2012 |
| JP | 2012-113589 A | 6/2012 |
| KR | 10-2013-0065317 A | 6/2013 |

OTHER PUBLICATIONS

Anna Heim, This emoticon-powered feedback app could help you boost customer satisfaction, Jun. 7, 2012.*
AT&T Community Forums, Dec. 11, 2011, https://forums.att.com/t5/Watching-DIRECTV/What-do-the-Icons-mean-Jack-Tomato-Tipped-Trash-Trash-barrel/td-p/4506273.*
The Emtrics Team, what is emetrics,Sep. 5, 2012, https://vimeo.com/39394754.*
The Hobbit: An Unexpected Journey, Dec. 30, 2012, https://web.archive.org/web/20121230160714/http:/www.rottentomatoes.com:80/m/the_hobbit_an_unexpected_journey/.*
"Popularity depends on web users evaluations," The Korea Economic Daily, Feb. 3, 2009.
Ratings of Webcomics, Humors/Hot Topics, http://blog.naver.com/rla123102?Redirect=Log&logNo=90144722454, Jun. 5, 2012.

* cited by examiner

Primary Examiner — Mohamed Abou El Seoud
(74) Attorney, Agent, or Firm — Marshall, Gerstein & Borun LLP

(57) ABSTRACT

An interfacing method for user feedback is disclosed, in which the interfacing method may include determining an expression mode of at least one interface element among a plurality of interface elements based on a relative relationship among cumulative numbers of the interface elements selected from the interface elements corresponding to response paths to contents.

15 Claims, 15 Drawing Sheets

FIG. 8

|  |  | Like | Funny | Wonderful | Surprised | Sad | Angry |
|---|---|---|---|---|---|---|---|
| 1010 | First level | | | | | | |
| 1020 | Second level | | | | | | |
| 1030 | Third level | | | | | | |

FIG. 11

| A | B | C | D | E | F | |
|---|---|---|---|---|---|---|
| Second level or Third level | Second level or Third level | Second level or Third level | Second level or Third level | Second level or Third level | Second level or Third level | 1510 |
| Second level or Third level | Second level or Third level | First level | First level | First level | First level | 1520 |
| Second level or Third level | First level | First level | First level | First level | First level | 1530 |

INTERFACING METHOD FOR USER FEEDBACK

BACKGROUND OF THE INVENTION

1. Field of the Invention

Embodiments relate to an interfacing method for user feedback.

2. Description of the Related Art

Digital contents are provided to users through the Internet, in various forms such as a document, a photograph, a video, a cartoon, a map, a blog, a mini-homepage, a sound, music, a skin, and an avatar. Recently, as use of the Internet through portable terminals has been generalized and thus, the number of digital contents has increased exponentially.

Thus, there is a desire for technology for appropriately feeding back user responses to digital contents. Conventional feedback technologies may simply count user responses and display the count. Such simple feedback technologies may not intuitively convey a current state of the user responses.

Thus, there is a desire for interactive feedback technology that may intuitively change based on a current state of user responses.

SUMMARY OF THE INVENTION

According to an aspect, there is provided an interfacing method for user feedback, including obtaining cumulative numbers of interface elements selected from the interface elements corresponding to response paths to a content, and determining an expression mode of at least one interface element among the interface elements based on a relative relationship among the cumulative numbers.

The relative relationship among the cumulative numbers may include a standard associated with relative numerical values of the cumulative numbers.

The determining of the expression mode may include modifying the expression mode of the at least one interface element based on a standard associated with the relative numerical values of the cumulative numbers and a standard associated with absolute numerical values of the cumulative numbers.

The determining of the expression mode may include modifying the expression mode of the at least one interface element based on statistics of the cumulative numbers.

The determining of the expression mode may include classifying the interface elements into a first group and a second group based on magnitudes of the cumulative numbers, and modifying the expression mode of the at least one interface element based on a relative relationship between statistics of first cumulative numbers of interface elements in the first group and statistics of second cumulative numbers of interface elements in the second group.

The determining of the expression mode may further include at least one of modifying an expression mode of at least one interface element in the first group based on a relative relationship among the first cumulative numbers and at least one of the first cumulative numbers, and modifying an expression mode of at least one interface element in the second group based on a relative relationship among the second cumulative numbers and at least one of the second cumulative numbers.

An expression mode of each interface element may include at least one of an appearance, a location, and an expression level. The appearance may include at least one of an image expressing an interface element, a size of the interface element, and a visual effect applied to the interface element.

Each interface element may match a plurality of images corresponding to a plurality of expression levels, and may be expressed by an image corresponding to a current expression level.

Each interface element may include at least one of an information component and an input control.

The determining of the expression mode may include setting expression levels of the interface elements to be a preset second level, when a highest cumulative number among the cumulative numbers is less than a first threshold value.

The determining of the expression mode may include classifying the interface elements into a first group and a second group based on magnitudes of the cumulative numbers, and setting expression levels of interface elements in the second group to be a preset first level, when a sum of cumulative numbers of interface elements in the first group is greater than a sum of cumulative numbers of the interface elements in the second group by a second threshold rate or greater.

When a difference between a highest cumulative number among the cumulative numbers of the interface elements in the first group and any one of remaining cumulative numbers is greater than a preset third threshold partial rate of the highest cumulative number, the determining of the expression mode may further include setting an expression level of an interface element corresponding to the any one of the remaining cumulative numbers to be the first level.

According to another aspect, there is provided a server including a counter configured to count cumulative numbers of interface elements selected from the interface elements corresponding to response paths to a content, a receiver configured to receive a request signal for requesting a page associated with the contents, a determiner configured to determine an expression mode of at least one interface element among the interface elements based on a relative relationship among the cumulative numbers, and a transmitter configured to transmit a response signal including the determined expression mode.

According to still another aspect, there is provided a terminal including a transmitter configured to transmit a request signal for requesting a page associated with contents, a receiver configured to receive a response signal including cumulative numbers of interface elements selected from the interface elements corresponding to response paths to the contents, and a determiner configured to determine an expression mode of at least one interface element among the interface elements based on a relative relationship among the cumulative numbers.

BRIEF DESCRIPTION OF THE DRAWINGS

These and/or other aspects, features, and advantages of the invention will become apparent and more readily appreciated from the following description of embodiments, taken in conjunction with the accompanying drawings of which:

FIG. 8 illustrates images corresponding to expression levels of interface elements according to an embodiment;

FIGS. 9A through 11 illustrate a change in expression modes of interface elements according to an embodiment.

DETAILED DESCRIPTION

Figure 1:
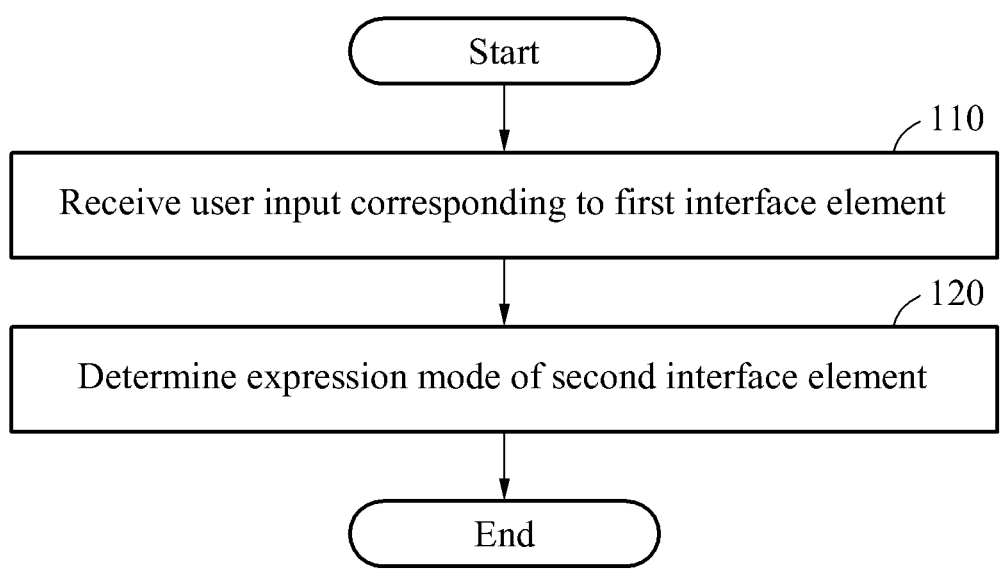
FIGS. 1 through 3 are a flowchart and diagrams illustrating an interfacing method for user feedback according to an embodiment.

Reference will now be made in detail to embodiments of the present invention, examples of which are illustrated in the accompanying drawings, wherein like reference numerals refer to the like elements throughout. Embodiments are described below to explain the present invention by referring to the figures.

Figure 2:
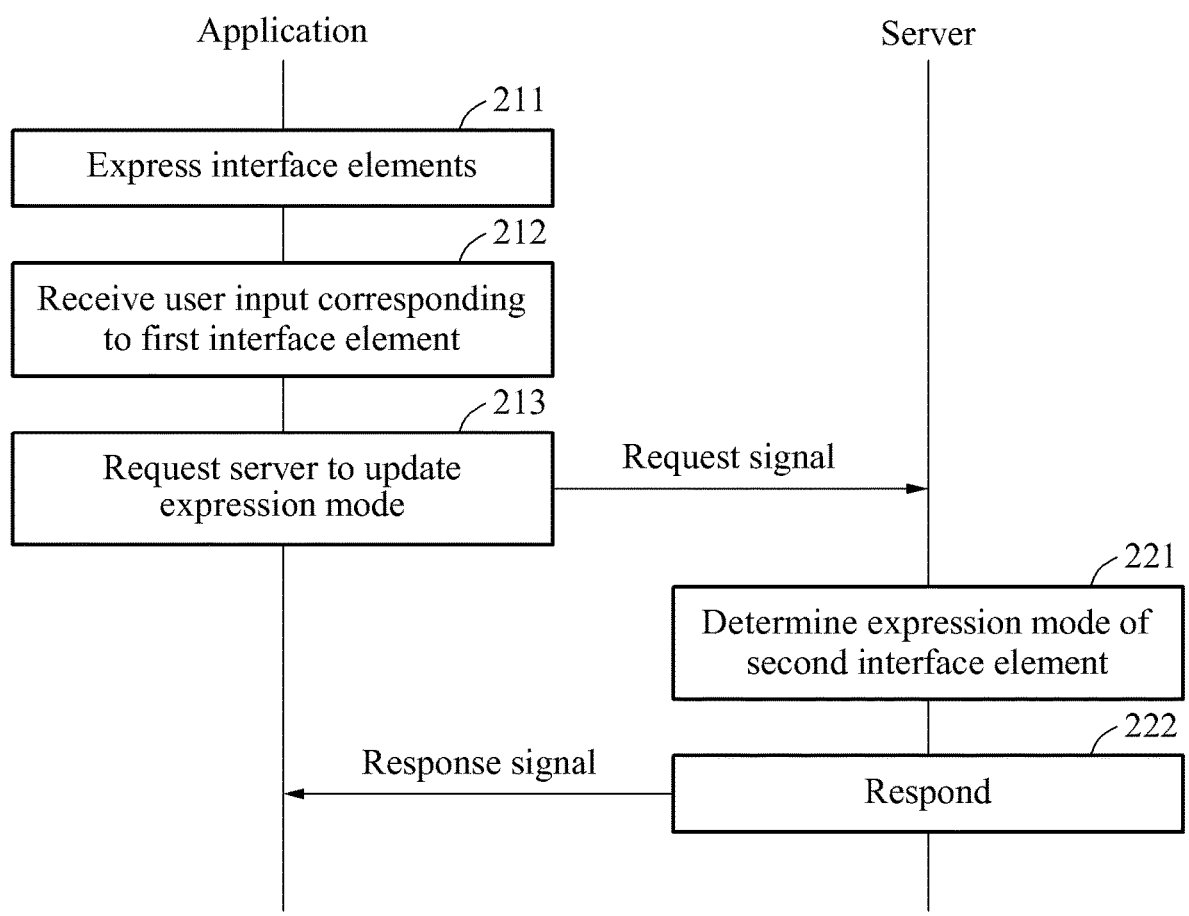
Figure 3:
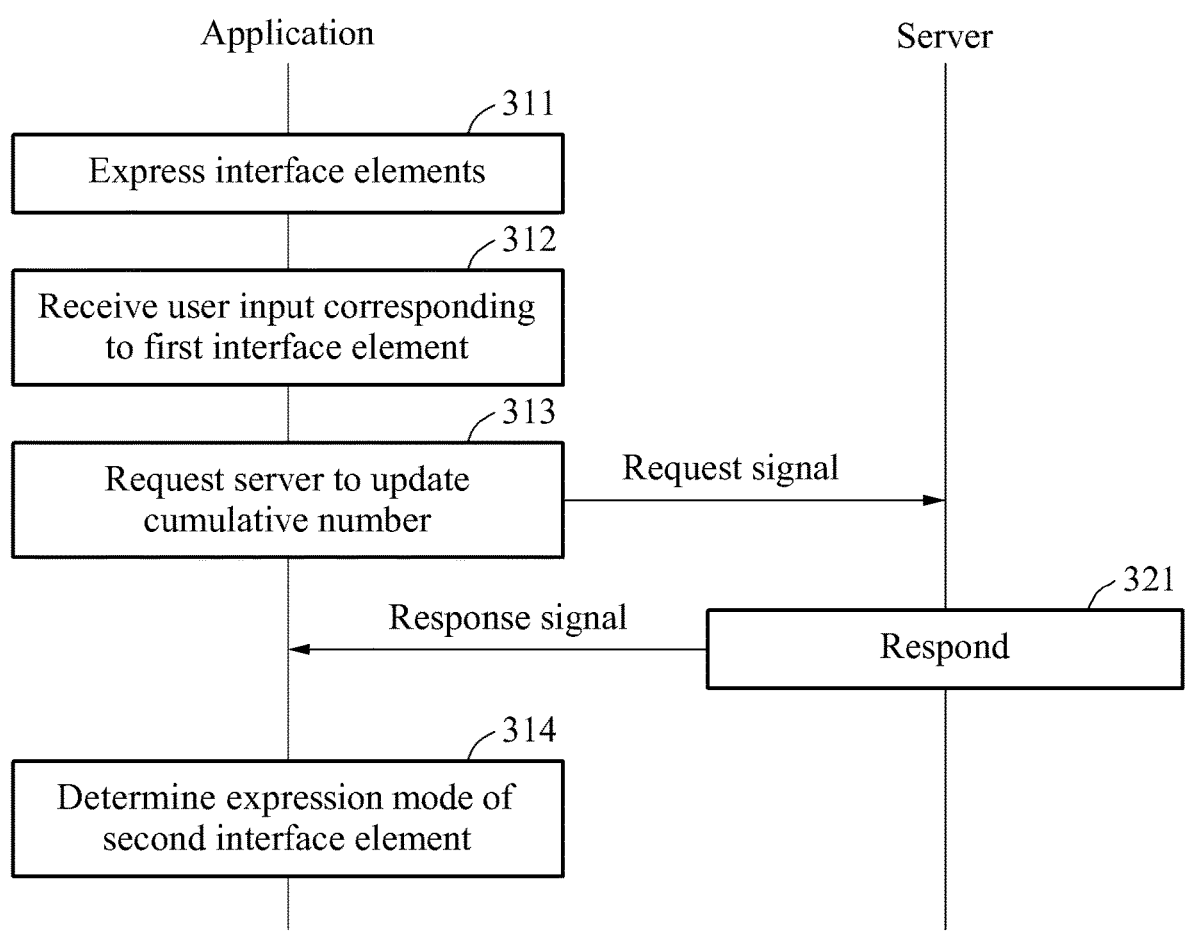

FIGS. 1 through 3 are a flowchart and diagrams illustrating an interfacing method for user feedback according to an embodiment. Referring to FIG. 1, the interfacing method includes operation 110 of receiving a user input corresponding to a first interface element among a plurality of interface elements, and operation 120 of determining an expression mode of a second interface element distinguished from the first interface element based on the received user input.

The operations described with reference to FIG. 1 may be performed by a server or a client. The server is a device configured to provide a service to the client, and the client is a device configured to request the server for the service. Each of the server and the client may be configured as a terminal, a personal computer (PC), a tablet computer, a smartphone, a personal digital assistant (PDA), a wearable device, and the like. The server and the client may communicate with each other. Examples of performing the operations by the server or the client will be described with reference to FIGS. 2 and 3.

The interface elements refer to elements for user interface (UI). Through such interface elements, information may be provided to a user or an input may be received from the user.

In one example, an interface element may be an information component configured to provide information to a user. The information component may provide the information to the user through various information providing methods, for example, a visual, an auditory, a tactile, an olfactory, and a gustatory method. For example, an interface element may include at least one of an image and an icon that provide a user with visual information.

In another example, an interface element may be an input control configured to receive a user input. The input control may receive the user input through various input methods, for example, a mouse, a keyboard, a touch, a gesture, a motion, and a voice input method. For example, an interface element may include at least one of a button, a check box, a radio button, and a toggle switch.

In still another example, an interface element may be an element in which the information component and the input control are combined. For example, an interface element may include at least one of a selectable image and a selectable icon.

The interface elements may correspond to respective response paths to contents provided to a user. The response paths indicate options used for receiving, as feedback, a response from the user to the contents. For example, referring to Table 1, the response paths to the contents may include, for example, "like," "funny," "wonderful," "surprised," "sad," and "angry."

TABLE 1

| Like | Funny | Wonderful | Surprised | Sad | Angry |
| --- | --- | --- | --- | --- | --- |

Table 1 illustrates the response paths to the contents for ease of description. However, the response paths illustrated in Table 1 are provided only as examples and thus, various modifications may be made to the response paths to the contents.

In operation 110, the user input corresponding to the first interface element among the interface elements is received. For example, when the first interface element is the input control, the user input may be received through the first interface element. Alternatively, when the first interface element is the information component, the user input may be received through the input control corresponding to the first interface element.

As described in the foregoing, the first interface element may correspond to any one of the response paths to the contents provided to the user. For example, the first interface element may correspond to "like."

In operation 120, the expression mode of the second interface element distinguished from the first interface element is determined based on the received user input corresponding to the first interface element. For example, when the user input corresponding to the first interface element is received, the expression mode of the second interface element may be modified. Alternatively, when a predetermined condition is satisfied in response to the user input corresponding to the first interface element, the expression mode of the second interface element may be modified. The predetermined condition may be variously set, for example, a condition associated with a cumulative number of the first interface element selected from the interface elements, and a condition associated with a relative relationship between the cumulative number of the first interface element selected and cumulative numbers of other interface elements selected from the interface elements.

According to an embodiment, when the user input corresponding to the first interface element is received, the cumulative number of the first interface element selected may be updated. The cumulative number of the first interface element selected may be updated through the server. The cumulative number may be also referred to as a number of votes obtained.

For example, the server may collect information from a plurality of clients. A first application installed in a first client may provide interface elements to a first user. When a user input corresponding to a first interface element among the interface elements is received, the first application may transmit the received user input to the server. The server may increase a cumulative number of the first interface element selected from the interface elements. Similarly, a second application installed in a second client may provide the interface elements to a second user. When a user input corresponding to the first interface element among the interface elements is received, the second application may transmit the received user input to the server. The server may increase the cumulative number of the first interface element selected.

In such a case, the expression mode of the second interface element may be determined based on the cumulative number of the first interface element selected. In one example, when the cumulative number of the first interface element selected is greater than a preset threshold value, the expression mode of the second interface element may be modified.

According to an embodiment, when the user input corresponding to the first interface element is received, a first cumulative number of the first interface element selected from the interface elements may be updated and a second cumulative number of the second interface element selected from the interface elements may be obtained. The first cumulative number of the first interface element selected may be updated through the server. In addition, the second cumulative number of the second interface element selected may be previously counted through the server.

In such a case, the expression mode of the second interface element may be determined based on a relative relationship between the first cumulative number of the first interface element selected and the second cumulative number of the second interface element selected. The relative relationship between the first cumulative number and the second cumulative number may be variously set. In one example, when a difference between the first cumulative number and the second cumulative number is greater than or equal to a preset threshold rate, for example, a factor of 10 times, the expression mode of the second interface element may be modified. Here, the expression mode of the second interface element to be modified when the first cumulative number is less than the second cumulative number may differ from the expression mode of the second interface element to be modified when the first cumulative number is greater than the second cumulative number. In another example, the expression mode of the second interface element may be modified, when the first cumulative number is greater than the second cumulative number, and based on whether the difference between the first cumulative number and the second cumulative number is within a preset threshold partial rate of the first cumulative number, for example, 1/10.

Alternatively, the expression mode of the second interface element may be determined based further on the second cumulative number in addition to the relative relationship between the first cumulative number and the second cumulative number. In one example, when the first cumulative number and the second cumulative number differ by a preset threshold rate, for example, by a factor of 10 times, or greater, the expression mode of the second interface element may be modified based on whether the second cumulative number is greater than a preset threshold value, for example, 100.

According to an embodiment, when the user input corresponding to the first interface element is received, respective cumulative numbers of the interface elements selected from the interface elements may be obtained. The cumulative number of the first interface element selected may be updated through the server, and the cumulative numbers of the remaining interface elements may be previously counted through the server. In such a case, the expression mode of the second interface element may be modified based on a relative relationship among the cumulative numbers of the interface elements selected and at least one of the cumulative numbers.

An expression mode of an interface element indicates a parameter to change a mode of expressing an interface element, and may include at least one of, for example, an appearance, a location, and an expression level.

An appearance of an interface element may include at least one of an image expressing the interface element, a size of the interface element, and a visual effect applied to the interface element. A location of an interface element indicates a location at which the interface element is expressed, and may include an absolute location or a relative location with respect to another interface element.

An expression level of an interface element indicates a parameter to express the interface element in phases. An interface element may match a plurality of images corresponding to a plurality of expression levels. An interface element may be expressed by an image corresponding to a set expression level.

For example, an interface element may match three images corresponding to three expression levels. When an expression level of an interface element is set as a first level, a second level, or a third level, the interface element may be expressed as a first image corresponding to the first level, a second image corresponding to the second level, or a third image corresponding to the third level.

According to an embodiment, an interface element may match a plurality of images, videos, sounds, vibration patterns, or scents corresponding to a plurality of expression levels, or a combination thereof. In such a case, the interface element may be expressed by an image, a video, a sound, a vibration pattern, or a scent corresponding to a set expression level, or a combination thereof.

Hereinafter, examples of performing the operations described with reference to FIG. 1 by the server or the client will be described in detail with reference to FIGS. 2 and 3. Although an example of providing visual information by a plurality of interface elements will be described herein, various modifications may be made to the interface elements to provide the visual information, auditory information, tactile information, olfactory information, gustatory information, or a combination thereof.

Referring to FIG. 2, the operations described with reference to FIG. 1 are performed by the server. In operation 211, an application installed in the client, hereinafter simply referred to as an application, expresses a plurality of interface elements. For example, the application may visually express the interface elements.

In operation 212, the application receives a user input corresponding to a first interface element among the interface elements. For example, an input of selecting the first interface element from the interface elements may be received through an input control.

In operation 213, the application requests the server to update an expression mode of an interface element expressed by the application. The application transmits, to the server, a request signal for requesting the updating of the expression mode. The request signal may include the user input received in operation 212. For example, the request signal may include information indicating that the first interface element is selected. The server may receive the user input through the application, and an operation of receiving the user input by the server may correspond to the operation 110 described with reference to FIG. 1.

In operation 221, the server determines an expression mode of a second interface element based on the user input. For example, the server may update a cumulative number of the first interface element selected, and modify the expression mode of the second interface element based on the cumulative number of the first interface element selected. The operation 221 may correspond to the operation 120 described with reference to FIG. 1.

In operation 222, the server responds to the request for the updating of the expression mode. The server transmits, to the application, a response signal in response to the request for the updating of the expression mode. The response signal may include information about the updating of the expression mode. For example, the response signal may include an updated expression mode of the second interface element. For example, when an expression level of the second interface element is updated, the server may further transmit, to the application, an image corresponding to the updated expression level.

Referring to FIG. 3, the operations described with reference to FIG. 1 are performed by the application. In operation 311, the application expresses a plurality of interface elements. For example, the application may visually express the interface elements.

In operation 312, the application receives a user input corresponding to a first interface element among the interface elements. For example, an input of selecting the first interface element from the interface elements may be received through an input control. The operation 312 may correspond to the operation 110 described with reference to FIG. 1.

In operation 313, the application requests the server to update a cumulative number of the first interface element selected from the interface elements. The application may transmit, to the server, a request signal for requesting the updating of the cumulative number.

In operation 321, the server responds to the request for the updating of the cumulative number. The server may transmit, to the application, a response signal in response to the request for the updating of the cumulative number. The response signal may include an updated cumulative number of the first interface element selected.

In operation 314, the application determines an expression mode of a second interface element based on the updated cumulative number of the first interface element selected. The operations 313 and 314 may correspond to the operation 120 described with reference to FIG. 1.

Figure 4:
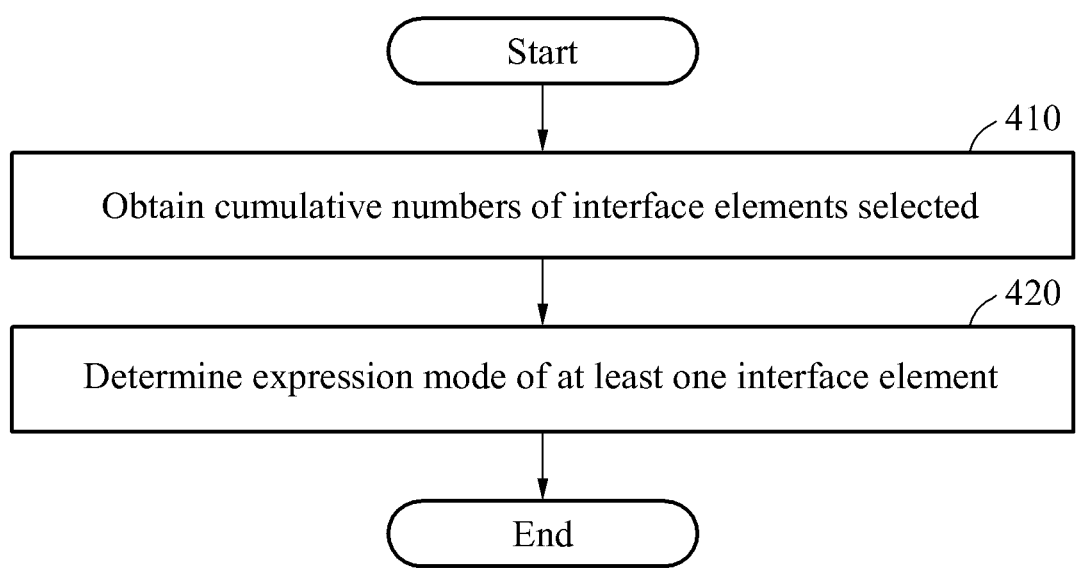
FIGS. 4 through 6 are a flowchart and diagrams illustrating an interfacing method for user feedback according to another embodiment.
Figure 5:
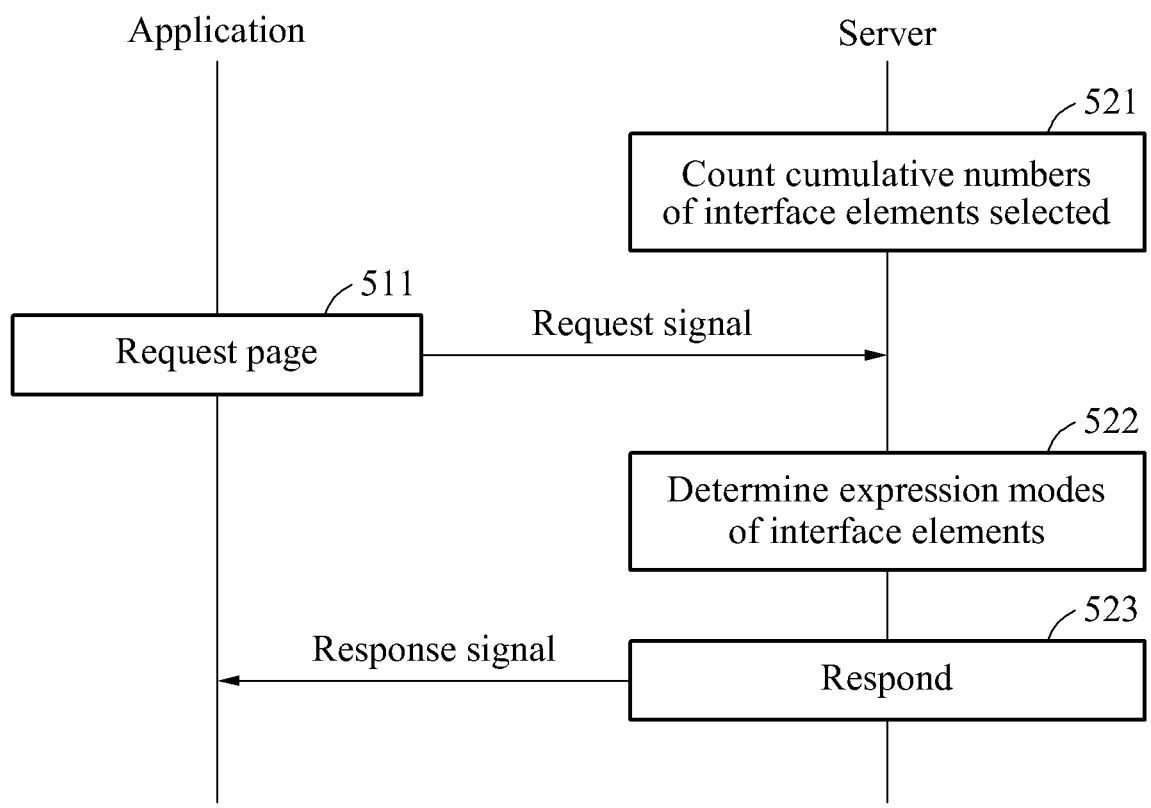
Figure 6:
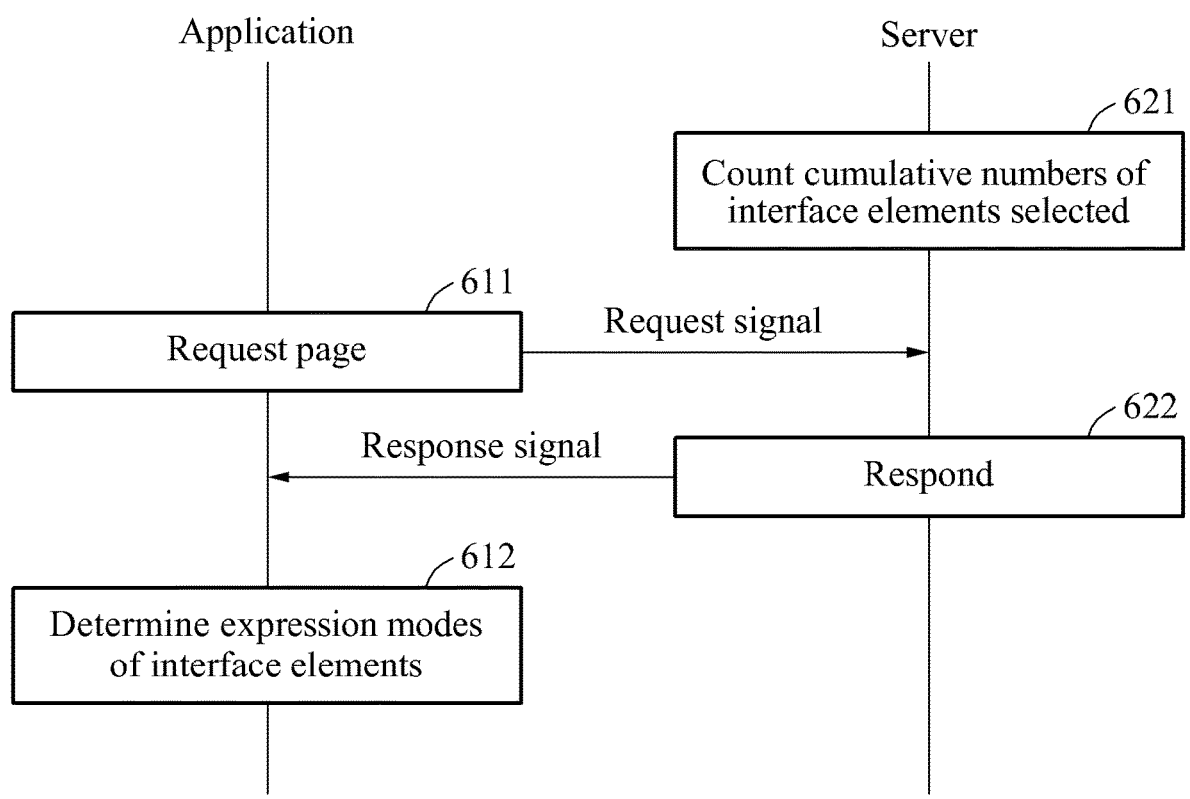

FIGS. 4 through 6 are a flowchart and diagrams illustrating an interfacing method for user feedback according to another embodiment. Referring to FIG. 4, the interface method includes operation 410 of obtaining cumulative numbers of interface elements selected, and operation 420 of determining an expression mode of at least one interface element among the interface elements based on at least one of a first standard associated with the cumulative numbers and a second standard associated with a relative relationship among the cumulative numbers.

The operations described with reference to FIG. 4 may be performed by a server or a client. Examples of performing the operations described with reference to FIG. 4 by the server or the client will be described in detail with reference to FIGS. 5 and 6.

The descriptions of the interface elements provided with reference to FIG. 1 may be applicable here and thus, detailed and repeated descriptions will be omitted.

In operation 410, the cumulative numbers of the interface elements selected are obtained. The cumulative numbers of the interface elements selected may be counted through the server.

For example, the server may collect information from a plurality of clients. A first application installed in a first client may provide the interface elements to a first user. When a user input of selecting any one from the interface elements is received, the first application may transmit the received user input to the server. The server may then increase a cumulative number of the interface element selected from the interface elements.

Similarly, an n-th application installed in an n-th client may provide the interface elements to an n-th user. Here, "n" denotes an integer greater than or equal to 2. When a user input of selecting any one from the interface elements is received, the n-th application may transmit the received user input to the server. The server may then increase a cumulative number of the interface element selected by the n-th user.

The server may obtain, from a memory configured to store count information, the cumulative numbers of the interface elements selected. The client may obtain, from the server, the cumulative numbers of the interface elements selected.

In operation 420, the expression mode of the at least one interface element among the interface elements is determined based on at least one of the first standard associated with the cumulative numbers and the second standard associated with the relative relationship among the cumulative numbers. The first standard may be associated with absolute numerical values of the cumulative numbers. The second standard may be associated with the relative relationship among the cumulative numbers and, for example, relative numerical values of the cumulative numbers.

According to an embodiment, when the cumulative numbers of the interface elements are obtained, the expression mode of the at least one interface element may be modified based on statistics of the cumulative numbers. For example, when a highest cumulative number among the cumulative numbers is less than a preset threshold value, the expression mode of the at least one interface element may be modified.

According to an embodiment, when the cumulative numbers of the interface elements are obtained, the interface elements may be classified into a first group and a second group based on magnitudes of the cumulative numbers. For example, two interface elements having greatest cumulative numbers may be classified into the first group and remaining interface elements may be classified into the second group.

In such an example, expression modes of the interface elements belonging to at least one of the first group and the second group may be modified based on at least one of first cumulative numbers of the interface elements in the first group, second cumulative numbers of the interface elements in the second group, and a relative relationship between the first cumulative numbers and the second cumulative numbers. For example, expression modes of the interface elements in the second group may be modified based on whether a sum of the first cumulative numbers of the interface elements in the first group is greater than a sum of the second cumulative numbers of the interface elements in the second group by a preset threshold rate or greater, for example, by a factor of three times or greater.

Alternatively, the expression modes of the interface elements in the first group may be modified based on a relative relationship among the first cumulative numbers and at least one of the first cumulative numbers. For example, the expression modes of the interface elements in the first group may be modified based on a highest cumulative number among the first cumulative numbers, and on whether at least one interface element in the first group has a cumulative number within a preset threshold range.

Alternatively, the expression modes of the interface elements in the second group may be modified based on a relative relationship among the second cumulative numbers and at least one of the second cumulative numbers. For example, the expression modes of the interface elements in the second group may be modified based on whether at least one interface element in the second group has a cumulative number greater than a preset threshold value.

The descriptions provided with reference to FIG. 1 may be applicable to an expression mode of an interface element and a method of modifying an expression mode of an interface element and thus, detailed and repeated descriptions will be omitted here.

Examples of performing the operations described with reference to FIG. 4 by the server or the client will be described in detail with reference to FIGS. 5 and 6. Although an example of providing visual information by a plurality of interface elements will be described herein, various modifications may be made to the interface elements to provide the visual information, auditory information, tactile information, olfactory information, gustatory information, or a combination thereof.

Referring to FIG. 5, the operations described with reference to FIG. 4 are performed by the server. In operation 521, the server counts cumulative numbers of interface elements selected. For example, the server may count the cumulative numbers of the interface elements selected based on user inputs to be received through a plurality of clients.

In operation 511, an application installed in the client requests the server for a content page. The content page may include a webpage accessible through a general web browser, an application page accessible through a dedicated application, and the like. The client may transmit, to the server, a request signal for requesting the content page. The request signal may include information specifying the content page which is a target for the request, for example, an address of the content page.

In operation 522, the server determines expression modes of the interface elements. For example, the server may detect interface elements included in the requested page. The server may obtain, from a memory, cumulative numbers of the interface elements selected. The server may modify the expression modes of the interface elements based on at least one of a standard associated with absolute numerical values of the cumulative numbers and a standard associated with a relative relationship among the cumulative numbers. The operation 522 may correspond to the operations 410 and 420 described with reference to FIG. 4.

In operation 523, the server responds to the request for the content page. The server may transmit, to the application, a response signal in response to the request for the content page. The response signal may include content page information. The response signal may include information associated with the expression modes of the interface elements, for example, images expressing the interface elements.

Referring to FIG. 6, the operations described with reference to FIG. 4 are performed by the application. In operation 621, the server counts cumulative numbers of interface elements selected. For example, the server may count the cumulative numbers of the interface elements selected based on user inputs to be received through a plurality of clients.

In operation 611, the application requests the server for a content page. The application may transmit, to the server, a request signal for requesting the content page. The request signal may include information specifying the content page which is a target for the request, for example, an address of the content page.

In operation 622, the server responds to the request for the content page. The server transmits, to the application, a response signal in response to the request for the content page. The response signal may include content page information. The response signal may include cumulative numbers of interface elements selected. For example, the server may detect a plurality of interface elements included in the requested content page. The server may obtain, from a memory, the cumulative numbers of the interface elements selected. The server may include, in the response signal, the cumulative numbers of the interface elements selected. The application may receive the response signal, and obtain the cumulative numbers of the interface elements selected. The operation 622 may correspond to the operation 410 described with reference to FIG. 4.

In operation 612, the application determines expression modes of the interface elements. For example, the application may modify the expression modes of the interface elements based on at least one of a standard associated with absolute numerical values of the cumulative numbers and a standard associated with a relative relationship among the cumulative numbers. The operation 612 may correspond to the operation 420 described with reference FIG. 4.

Figure 7A:
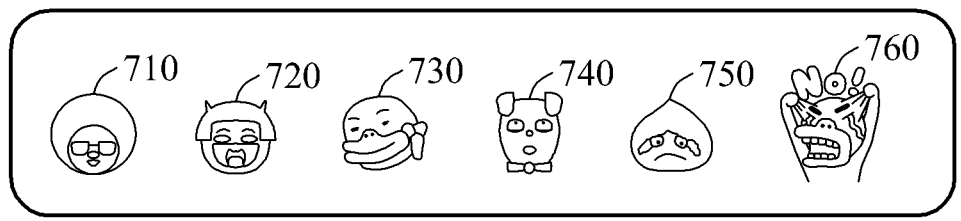
FIGS. 7A through 7C illustrate interface elements according to an embodiment.
Figure 7B:
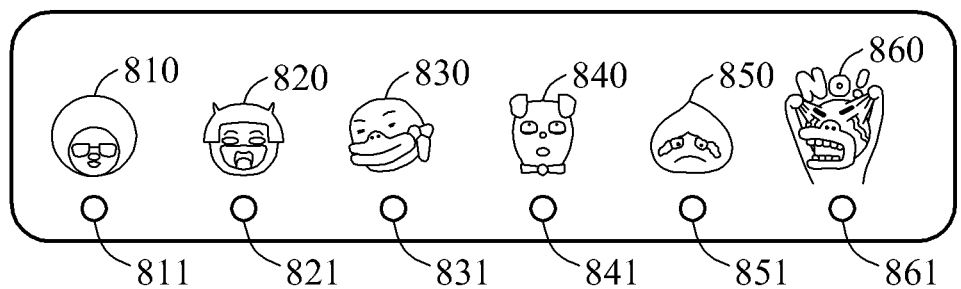
Figure 7C:
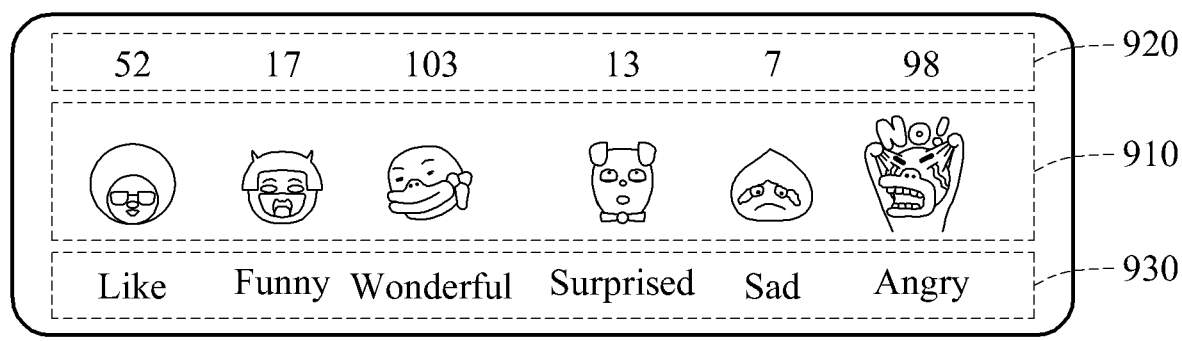

FIGS. 7A through 7C illustrate interface elements according to an embodiment. Referring to FIG. 7A, interface elements, for example, an interface element 710, an interface element 720, an interface element 730, an interface element 740, an interface element 750, and an interface element 760, correspond to response paths to contents provided to a user. In FIG. 7A, the interface element 710 corresponds to "like" among the response paths illustrated in Table 1. The interface element 720 corresponds to "funny," the interface element 730 corresponds to "wonderful," the interface element 740 corresponds to "surprised," the interface element 750 corresponds to "sad," and the interface element 760 corresponds to "angry," among the response paths illustrated in Table 1.

The interface elements 710 through 760 may be an element in which an information component and an input control are combined. For example, each of the interface elements 710 through 760 may be expressed as an image associated with a corresponding response path. The interface elements 710 through 760 may receive a user input through various input methods, for example, a mouse input method, a keyboard input method, a touch input method, a gesture input method, a motion input method, and a voice input method.

Referring to FIG. 7B, interface elements, for example, an interface element 810, an interface element 820, an interface element 830, an interface element 840, an interface element 850, and an interface element 860, correspond to response paths to contents provided to a user. For example, the interface elements 810 through 860 may correspond to the response paths illustrated in Table 1.

The interface elements 810 through 860 may be an information component. For example, each interface element may be expressed as an image associated with a corresponding response path.

Interface elements, for example, an interface element 811, an interface element 821, an interface element 831, an interface element 841, an interface element 851, and an interface element 861, may be an input control. For example, the interface elements 811 through 861 may receive user inputs corresponding to the interface elements 810 through 860.

Referring to FIG. 7C, interface elements 910 correspond to response paths to contents provided to a user. For example, the interface elements 910 may correspond to the response paths illustrated in Table 1.

The interface elements 910 may be an element in which an information component and an input control are combined. For example, each of the interface elements 910 may be expressed as an image associated with a corresponding response path. In addition, the interface elements 910 may receive a user input.

Interface elements 920 and interface elements 930 may be an information component. For example, the interface elements 920 may express, as numerical values, cumulative numbers of the interface elements 910 selected. In addition, the interface elements 930 may express, as text, response paths corresponding to the interface elements 910.

FIG. 8 illustrates images corresponding to expression levels of interface elements according to an embodiment. Referring to FIG. 8, interface elements match images corresponding to a first level 1010, images corresponding to a second level 1020, and images corresponding to a third level 1030.

The images at each level may be set to express, in phases, response paths corresponding to the interface elements. The images corresponding to the first level 1010 may be set to be identical with respect to the response paths. The images corresponding to the second level 1020 may be set to express the response paths, respectively. The images corresponding to the third level 1030 may be set to more intuitively express the response paths.

Figure 9A:
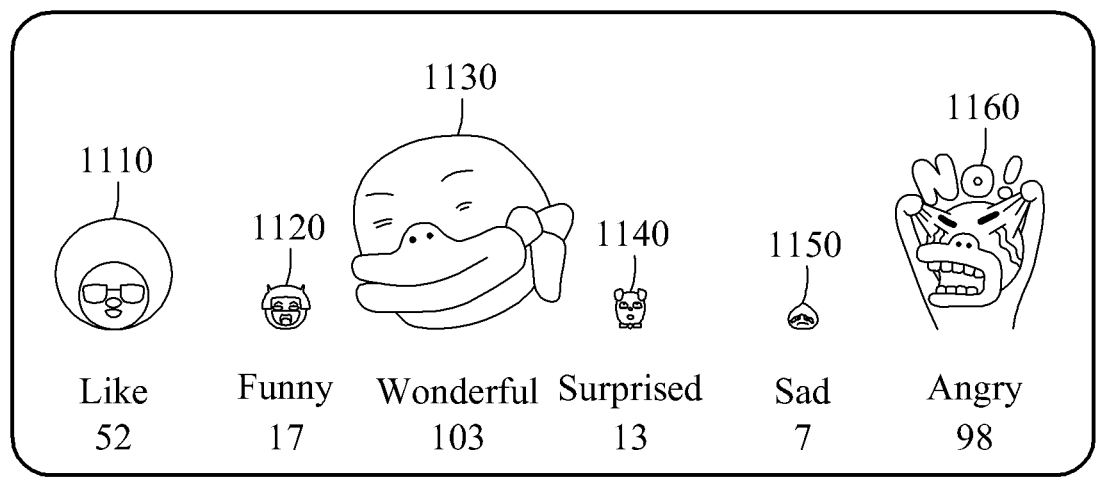

FIGS. 9A through 11 illustrate a change in expression modes of interface elements according to an embodiment. Referring to FIG. 9A, sizes of interface elements, for example, an interface element 1110, an interface element 1120, an interface element 1130, an interface element 1140, an interface element 1150, and an interface element 1160, are modified based on cumulative numbers of the interface elements 1110 through 1160 selected. For example, a size of an interface element having a higher cumulative number may be modified to be larger. Conversely, a size of an interface element having a lower cumulative number may be modified to be smaller.

Figure 9B:
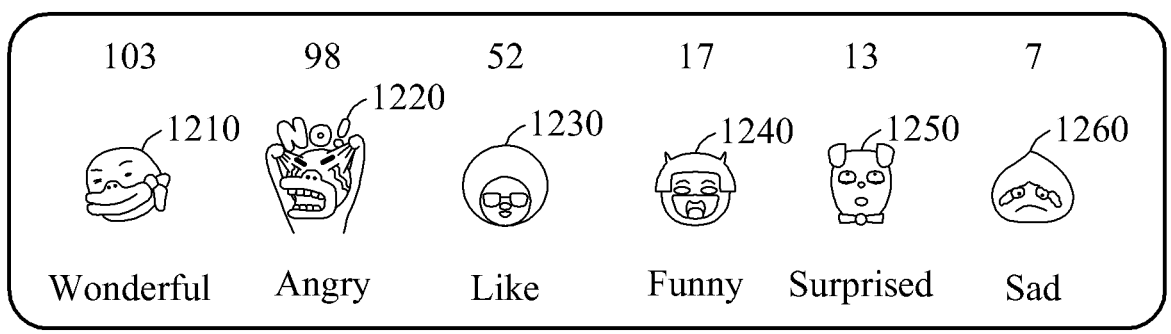

Referring to FIG. 9B, locations of interface elements, for example, an interface element 1210, an interface element 1220, an interface element 1230, an interface element 1240, an interface element 1250, and an interface element 1260, are modified based on cumulative numbers of the interface elements 1210 through 1260 selected. For example, a location of an interface element having a higher cumulative number may be modified to be a left location. Conversely, a location of an interface element having a lower cumulative number may be modified to be a right location.

Figure 9C:
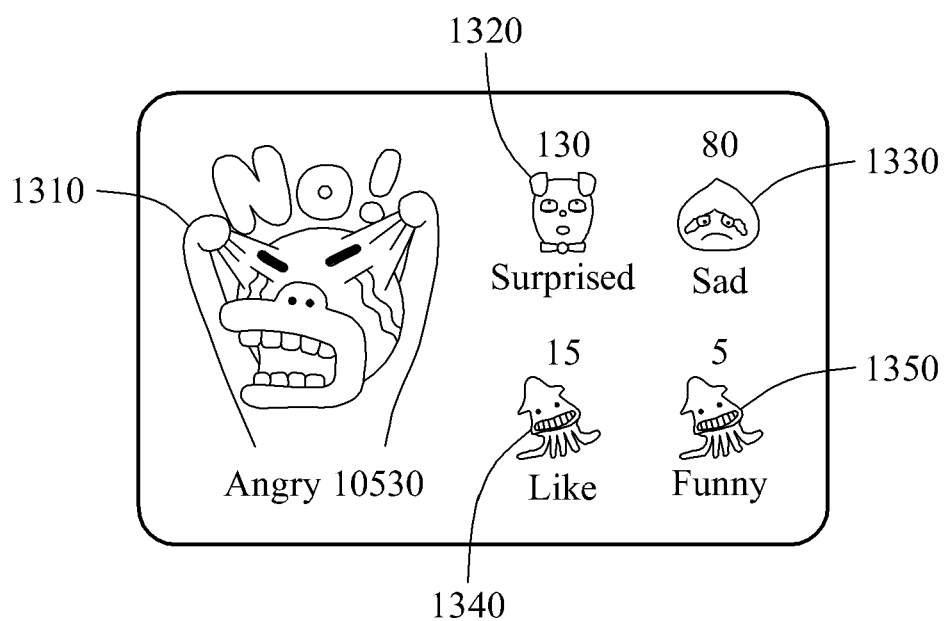

Referring to FIG. 9C, respective locations, sizes, and expression levels of interface elements, for example, an interface element 1310, an interface element 1320, an interface element 1330, an interface element 1340, and an interface element 1350, are modified based on cumulative numbers of the interface elements 1310 through 1350 selected. In FIG. 9C, the interface element 1310 having a highest cumulative number is expressed as a larger image compared to the remaining interface elements 1320 through 1350, and located on a left side. The remaining interface elements 1320 through 1350 are arranged in order of magnitudes of cumulative numbers of the remaining interface elements 1320 through 1350. Here, an expression level of the interface elements 1340 and 1350 having cumulative numbers less than a preset threshold value, for example, 50, is set to be a first level.

According to an embodiment, interface elements may be classified into a plurality of groups based on magnitudes of cumulative numbers of the interface elements selected. For example, six interface elements may be present, and the six interface elements may be classified into two groups. In such an example, each of the interface elements may be referred to as A, B, C, D, E, and F in order of the magnitudes of the cumulative numbers starting from a greatest magnitude. Here, based on the magnitudes of the cumulative numbers, two interface elements corresponding to A and B may be classified into a first group, and remaining interface elements corresponding to C, D, E, and F may be classified into a second group. C, D, E, and F may be indicated as X.

Various modifications may be made to determine a number of interface elements, a number of groups, and a method of classifying the interface elements into the groups. For example, one interface element corresponding to A may be classified into the first group, and remaining interface elements corresponding to B, C, D, E, and F may be classified into the second group.

Figure 10:
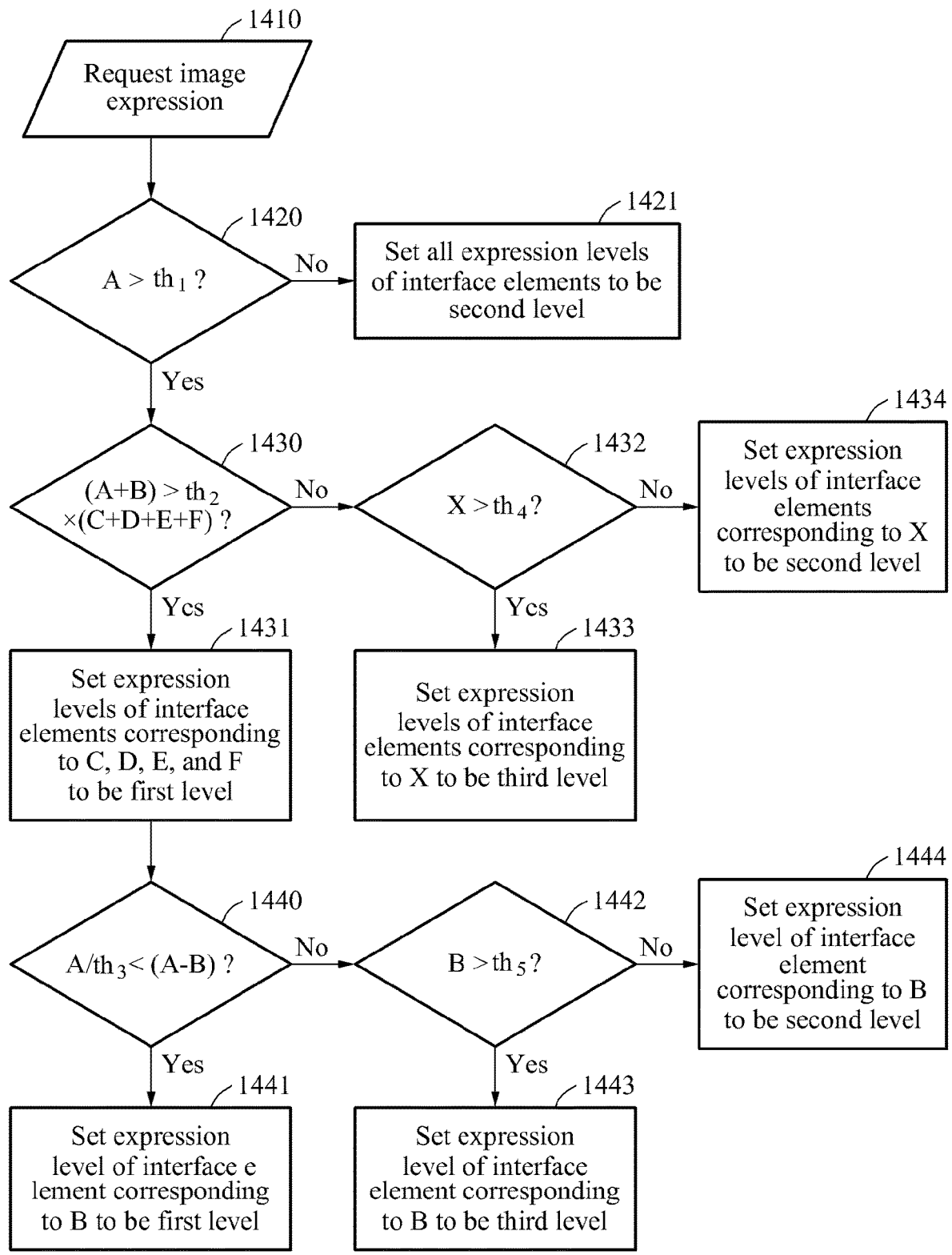

Referring to FIG. 10, when an image expression request is received in operation 1410, whether A is greater than a first threshold value $(th_1)$, for example, 100, is determined in operation 1420. When A is less than or equal to the first threshold value, expression levels of interface elements corresponding to A, B, C, D, E, and F are set to be a second level in operation 1421.

Conversely, when A is greater than the first threshold value, whether a sum of A and B, for example, A+B, is greater than a sum of C, D, E, and F, for example, C+D+E+F, by a second threshold rate $(th_2)$ or greater, for example, 3 or greater, is determined in operation 1430. When the sum of A and B is less than or equal to the sum of C, D, E, and F by the second threshold rate or greater, whether X is greater than a fourth threshold value $(th_4)$ is determined in operation 1432. When X is greater than the fourth threshold value, for example, 100, expression levels of interface elements corresponding to X is set to be a third level in operation 1433. For example, expression levels of interface elements having cumulative numbers greater than the fourth threshold value among C, D, E, and F may be set to be the third level.

When X is less than or equal to the fourth threshold value, the expression levels of the interface elements corresponding to X are set to be the second level in operation 1434. For example, the expression levels of the interface elements having cumulative numbers less than or equal to the fourth threshold value among C, D, E, and F may be set to be the second level.

When the sum of A and B is greater than the sum of C, D, E, and F by the second threshold rate, expression levels of interface elements corresponding to C, D, E, and F are set to be a first level in operation 1431. In operation 1440, whether a difference between A and B is greater than a third threshold partial rate $(th_3)$ of A, for example, 1/10, is determined. When the difference between A and B is greater than the third threshold partial rate of A, an expression level of an interface element corresponding to B is set to be the first level in operation 1441.

When the difference between A and B is less than or equal to the third threshold partial rate, whether B is greater than a fifth threshold value $(th_5)$, for example, 100, is determined in operation 1442. When B is greater than the fifth threshold value, the expression level of the interface element corresponding to B is set to be the third level in operation 1443. Conversely, when B is less than or equal to the fifth threshold level, the expression level of the interface element corresponding to B is set to be the second level in operation 1444.

In at least one of the operations 1433 and 1443, the expression level of the interface element corresponding to A is set to be the third level.

In at least one of the operations 1441, 1434, and 1444, the expression level of the interface element corresponding to A is set to be any one of the second level and the third level. For example, when A is greater than the preset threshold value, the interface element corresponding to A may be set to be the third level. Conversely, when A is less than or equal to the preset threshold value, the interface element corresponding to A is set to be the second level.

Referring to FIG. 11, various cases of setting expression levels of interface elements are illustrated. In case 1 1510, all interface elements are expressed at a second level or a third level. In case 2 1520, interface elements in a first group are expressed at the second level or the third level, and interface elements in a second group are expressed at a first level. As described in the foregoing, various modifications may be made to determine a number of interface elements, a number of groups into which the interface elements are classified, and a number of interface element included in each group.

In case 3 1530, an interface element having a highest cumulative number is expressed at the second level or the third level, and remaining interface elements are expressed at the first level. As described in the foregoing, expression modes of interface elements may be modified based on various statistics of cumulative numbers. For example, an interface element having a lowest cumulative number may be expressed at the first level, and remaining interface elements may be expressed at the second or the third level.

Although not illustrated, a server according to an embodiment may include a counter, a receiver, a determiner, and a transmitter. The counter may count cumulative numbers of interface elements selected from the interface elements corresponding to response paths to contents. For example, the counter may accumulate and count respective numbers of selecting the response paths to the contents by a plurality of users. The receiver may receive a request signal for requesting a page associated with the contents. For example, the receiver may receive the request signal from a terminal, for example, a client.

The determiner may determine an expression mode of at least one interface element based on a relative relationship among the cumulative numbers. The descriptions provided in the foregoing may be applicable to operations of the determiner and thus, detailed and repeated descriptions will be omitted here. The transmitter may transmit a response signal including the determined expression mode. For example, the transmitter may transmit the response signal to the terminal, for example, the client, requesting the content page.

A terminal according to an embodiment may include a transmitter, a receiver, and a determiner. The terminal may be a client. The transmitter may transmit a request signal requesting a page associated with contents. For example, the transmitter may transmit the request signal to a server. The receiver may receive a response signal including cumulative numbers of interface elements selected from the interface elements corresponding to response path to the contents. For example, the receiver may receive the response signal from the server in response to the request signal. The cumulative numbers of the interface elements selected may be counted by the server.

The determiner may determine an expression mode of at least one interface element based on a relative relationship among the cumulative numbers. The descriptions provided in the foregoing may be applicable to operations of the determiner and thus, detailed and repeated descriptions will be omitted here.

The embodiments described herein may be implemented using hardware components and software components. For example, the hardware components may include microphones, amplifiers, band-pass filters, audio to digital convertors, and processing devices. A processing device may be implemented using one or more general-purpose or special purpose computers, such as, for example, a processor, a controller and an arithmetic logic unit, a digital signal processor, a microcomputer, a field programmable array, a programmable logic unit, a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a processing device may include multiple processors or a processor and a controller. In addition, different processing configurations are possible, such a parallel processors.

The software may include a computer program, a piece of code, an instruction, or some combination thereof, to independently or collectively instruct or configure the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. The software and data may be stored by one or more non-transitory computer readable recording mediums. The non-transitory computer readable recording medium may include any data storage device that can store data which can be thereafter read by a computer system or processing device. Examples of the non-transitory computer readable recording medium include read-only memory (ROM), random-access memory (RAM), CD-ROMs, magnetic tapes, floppy disks, optical data storage devices. Also, functional programs, codes, and code segments that accomplish the examples disclosed herein can be easily construed by programmers skilled in the art to which the examples pertain based on and using the flow diagrams and block diagrams of the figures and their corresponding descriptions as provided herein.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

The invention claimed is:

1. An interfacing method for user feedback, comprising:
presenting via a user interface a plurality of selectable interface elements each presented according to a respective first expression mode of a respective plurality of expression modes, each of the selectable interface elements corresponding to a respective response path to a content, wherein, for each selectable interface element, the respective plurality of expression modes each determines a corresponding visual depiction of the selectable interface element;

receiving from each of a plurality of users, via the user interface, a user input indicated by a selection of at least one of the selectable interface elements;

obtaining cumulative numbers of selections for each of the plurality of selectable interface elements;

modifying the expression mode of at least one selectable interface element among the plurality of selectable interface elements from the first expression mode for the at least one selectable interface element to a different one of the respective plurality of expression modes for the at least one selectable interface element based on a combination of a first standard associated with a relative relationship among the cumulative numbers and a second standard associated with absolute numerical values of the cumulative numbers, wherein the modifying of the expression mode includes:
  classifying the selectable interface elements into a first group and a second group based on magnitudes of the cumulative numbers, and
  setting expression levels of selectable interface elements in the second group to be a preset first level, when a sum of cumulative numbers of selectable interface elements in the first group is greater than a sum of cumulative numbers of the selectable interface elements in the second group by a first threshold rate or greater; and causing the plurality of selectable interface elements to be presented via a user interface, wherein the at least one selectable interface element is presented in accordance with the different one of the respective plurality of expression modes for the at least one selectable interface element.

2. The interfacing method of claim 1, wherein the relative relationship among the cumulative numbers comprises a standard associated with relative numerical values of the cumulative numbers.

3. The interfacing method of claim 1, wherein the modifying of the expression mode comprises:
  modifying the expression mode of the at least one selectable interface element based on a standard associated with relative numerical values of the cumulative numbers and a standard associated with absolute numerical values of the cumulative numbers.

4. The interfacing method of claim 1, wherein the modifying of the expression mode comprises:
  modifying the expression mode of the at least one selectable interface element based on statistics of the cumulative numbers.

5. The interfacing method of claim 1, wherein the modifying of the expression mode comprises:
  modifying the expression mode of the at least one selectable interface element based on a relative relationship between statistics of first cumulative numbers of selectable interface elements in the first group and statistics of second cumulative numbers of selectable interface elements in the second group.

6. The interfacing method of claim 5, wherein the modifying of the expression mode further comprises at least one of:
  modifying an expression mode of at least one selectable interface element in the first group based on a relative relationship among the first cumulative numbers and at least one of the first cumulative numbers; and
  modifying an expression mode of at least one selectable interface element in the second group based on a relative relationship among the second cumulative numbers and at least one of the second cumulative numbers.

7. The interfacing method of claim 1, wherein an expression mode of each selectable interface element comprises at least one of an appearance, a location, and an expression level.

8. The interfacing method of claim 7, wherein the appearance comprises at least one of:
  an image expressing the selectable interface element;
  a size of the selectable interface element; and
  a visual effect applied to the selectable interface element.

9. The interfacing method of claim 1, wherein each selectable interface element matches a plurality of images corresponding to a plurality of expression levels, and is expressed by an image corresponding to a current expression level.

10. The interfacing method of claim 1, wherein each selectable interface element comprises at least one of:
  an information component; and
  an input control.

11. The interfacing method of claim 1, wherein the modifying of the expression mode comprises:
  setting expression levels of the selectable interface elements to be a preset second level, when a highest cumulative number among the cumulative numbers is less than a second threshold value.

12. The interfacing method of claim 1, wherein, when a difference between a highest cumulative number among the cumulative numbers of the selectable interface elements in the first group and any one of remaining cumulative numbers is greater than a preset third threshold partial rate of the highest cumulative number, the modifying of the expression mode further comprises:
  setting an expression level of a selectable interface element corresponding to the any one of the remaining cumulative numbers to be the first level.

13. A non-transitory computer readable medium having stored thereon instructions executable by a computer processor, the instructions executable to cause the processor to perform the method of claim 1.

14. A server, comprising:
a processor configured to:
count cumulative numbers of selections of each of a plurality of selectable interface elements, each of the plurality of selectable interface elements presented via a user interface in accordance with a respective first expression mode of respective pluralities of expression modes, each of the respective plurality of expression modes determining a corresponding visual depiction of the selectable interface element, and the selectable interface elements respectively corresponding to response paths to a content;
receive a request signal for requesting a page associated with the content;
modify the expression mode of at least one selectable interface element among the plurality of selectable interface elements from the first expression mode for the at least one selectable interface element to a different one of the respective plurality of expression modes for the at least one selectable interface element based on a combination of a first standard associated with a relative relationship among the cumulative numbers and a second standard associated with absolute numerical values of the cumulative numbers;

classify the selectable interface elements into a first group and a second group based on magnitudes of the cumulative numbers, set expression levels of selectable interface elements in the second group to be a preset first level, when a sum of cumulative numbers of selectable interface elements in the first group is greater than a sum of cumulative numbers of the selectable interface elements in the second group by a first threshold rate or greater; and transmit a response signal comprising the plurality of respective expression modes for the plurality of selectable interface elements, wherein the transmitted expression mode for the at least one interface element is the respective different one of the respective plurality of expression modes for the at least one selectable interface element.

15. A terminal, comprising:

a processor configured to:

transmit a request signal for requesting a page associated with contents;

receive a response signal comprising cumulative numbers of selections of each of a plurality of selectable interface elements, each of the plurality of selectable interface elements presented via a user interface in accordance with a respective first expression modes of respective pluralities of expression modes, each of the respective plurality of expression modes determining a corresponding visual depiction of the selectable interface element, and the selectable interface elements respectively corresponding to response paths to the contents;

modify the expression mode of at least one selectable interface element among the plurality of selectable interface elements from the first expression mode for the at least one selectable interface element to a different one of the respective plurality of expression modes for the at least one selectable interface element based on a combination of a first standard associated with a relative relationship among the cumulative numbers and a second standard associated with absolute numerical values of the cumulative numbers;

classify the selectable interface elements into a first group and a second group based on magnitudes of the cumulative numbers, set expression levels of selectable interface elements in the second group to be a preset first level, when a sum of cumulative numbers of selectable interface elements in the first group is greater than a sum of cumulative numbers of the selectable interface elements in the second group by a first threshold rate or greater; and present the plurality of selectable interface elements, wherein the at least one selectable interface element is presented in accordance with the different one of the respective plurality of expression modes for the at least one selectable interface element.

* * * * *